United States Patent
Iwafuchi et al.

(10) Patent No.: US 8,305,390 B2
(45) Date of Patent: Nov. 6, 2012

(54) COLOR GAMUT FORMING APPARATUS, COLOR CONVERTING APPARATUS, COLOR GAMUT FORMING METHOD, COLOR CONVERSION METHOD, COMPUTER READABLE MEDIUM AND COMPUTER DATA SIGNAL

(75) Inventors: Toshihiro Iwafuchi, Ebina (JP); Noriko Hasegawa, Ebina (JP); Yousuke Tashiro, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 692 days.

(21) Appl. No.: 12/170,595

(22) Filed: Jul. 10, 2008

(65) Prior Publication Data

US 2009/0122371 A1    May 14, 2009

(30) Foreign Application Priority Data

Nov. 14, 2007   (JP) ................. 2007-295764

(51) Int. Cl.
*G09G 5/02* (2006.01)
(52) U.S. Cl. .......... 345/590; 345/597; 345/604
(58) Field of Classification Search .......... 345/590
See application file for complete search history.

(56) References Cited

U.S. PATENT DOCUMENTS

2006/0244983 A1* 11/2006 Zeng ............... 358/1.9
2006/0274340 A1   12/2006 Yamazoe
2007/0035754 A1*  2/2007 Hori et al. ........ 358/1.9

FOREIGN PATENT DOCUMENTS

| JP | 2000-253269 A | 9/2000 |
| JP | 2001-036757 A | 2/2001 |
| JP | 2002-335416 A | 11/2002 |
| JP | 2003-153020 A | 5/2003 |
| JP | 2004-32140 A  | 1/2004 |
| JP | 2006-340105 A | 12/2006 |
| JP | 2007-060420 A | 3/2007 |
| JP | 2007-258835 A | 10/2007 |

OTHER PUBLICATIONS

Japanese Notification of Reasons for Refusal dated Jan. 6, 2010, in counterpart Japanese Application No. 2007-295764.

* cited by examiner

*Primary Examiner* — Lee M Tung
*Assistant Examiner* — Zhengxi Liu
(74) *Attorney, Agent, or Firm* — Sughrue Mion, PLLC

(57) ABSTRACT

A color gamut forming apparatus includes a reference color acquiring unit and a converted color gamut forming unit. The reference color acquiring unit sets at least a saturated color, which is reproducible on a contour of an input color gamut, as a reference input color and acquires a reference output color which is a color obtained by converting the input reference color into a color being reproducible in an output color gamut. The converted color gamut forming unit forms, in the output color gamut, a converted color gamut in which the reference output color corresponding to the saturated color on the contour of the input color gamut is a convex point.

9 Claims, 16 Drawing Sheets

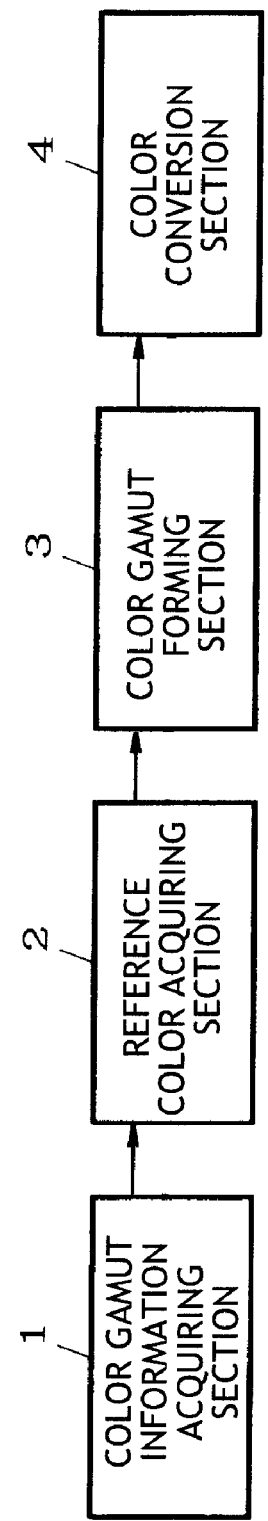

FIG. 2
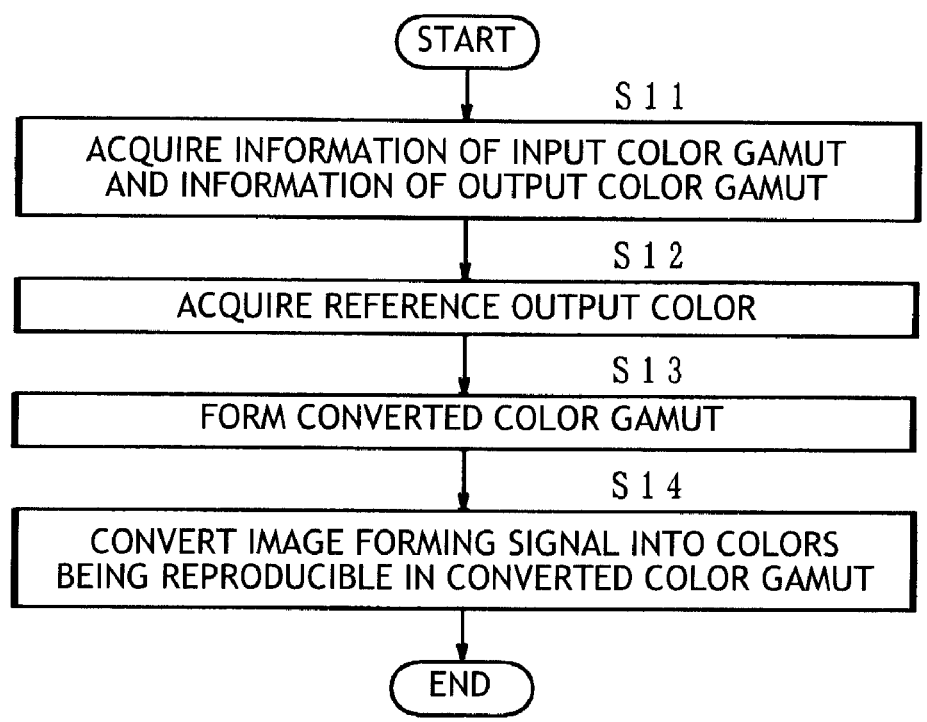

FIG. 3A
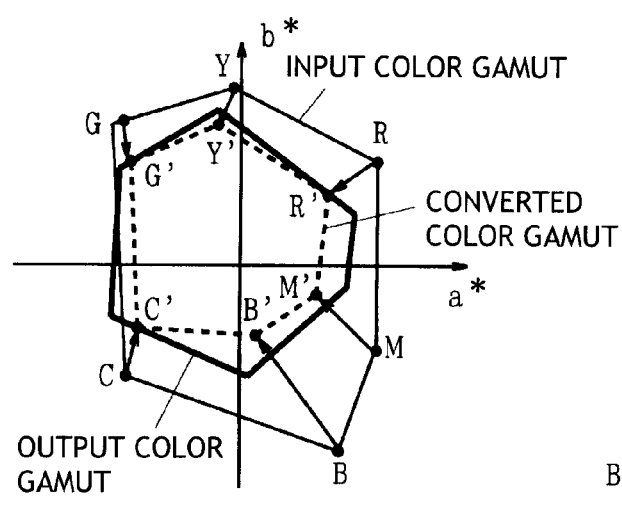
FIG. 3B
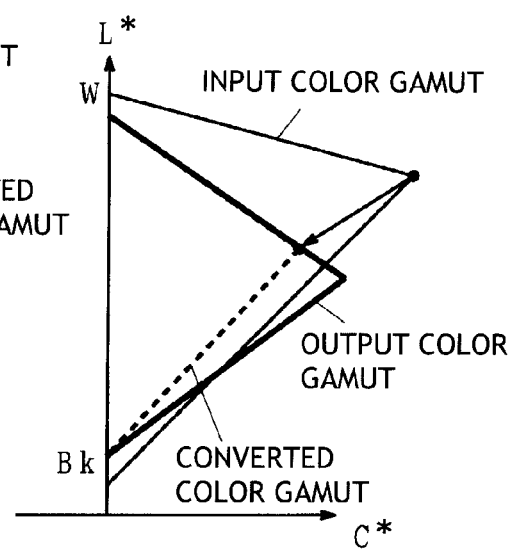

FIG. 4
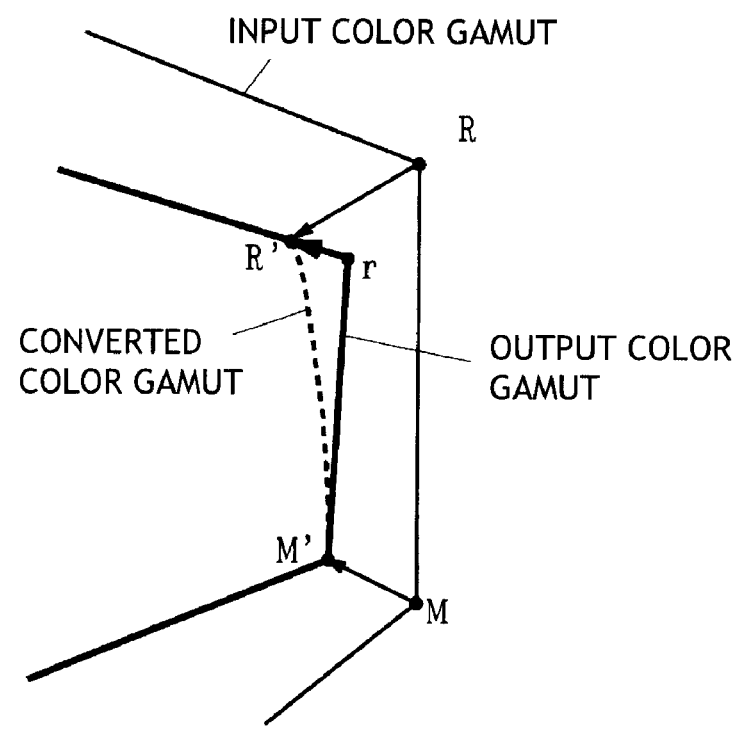

FIG. 5A
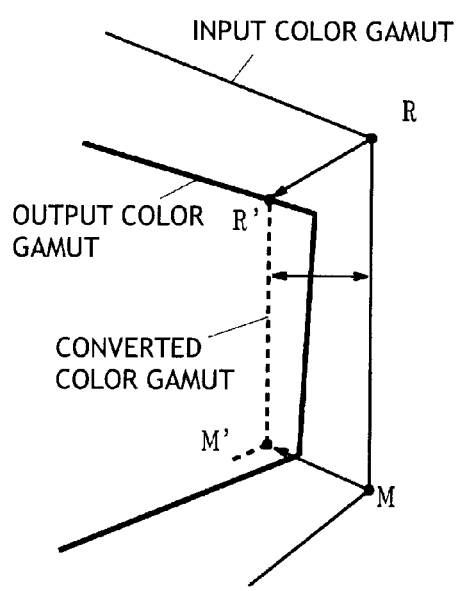
FIG. 5B
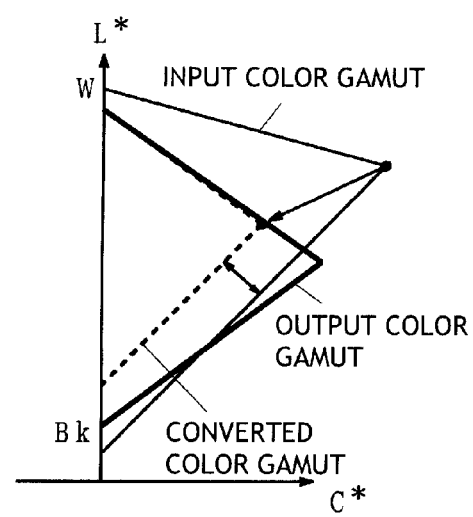

FIG. 6
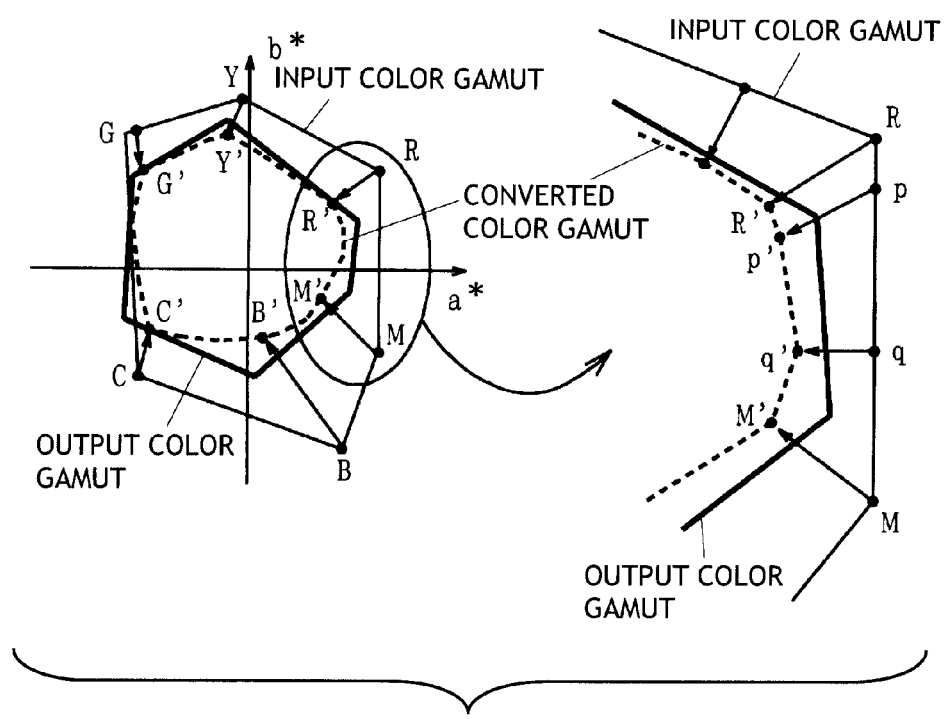

FIG. 7
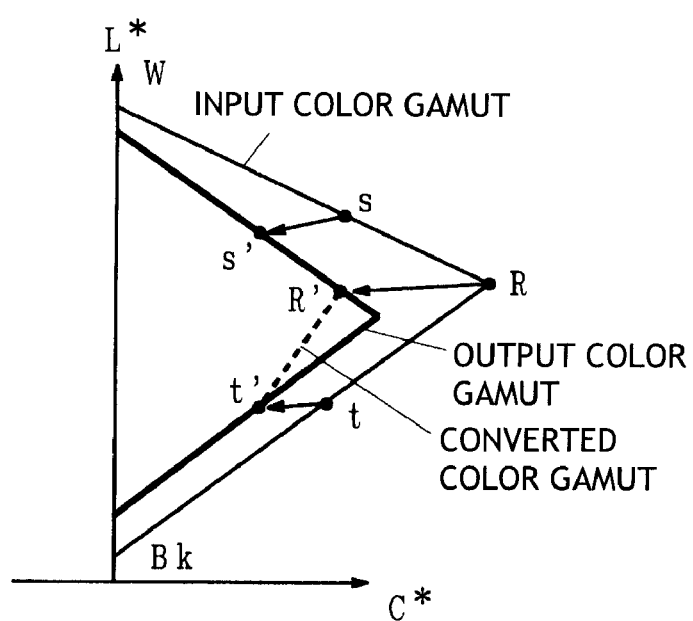

FIG. 8
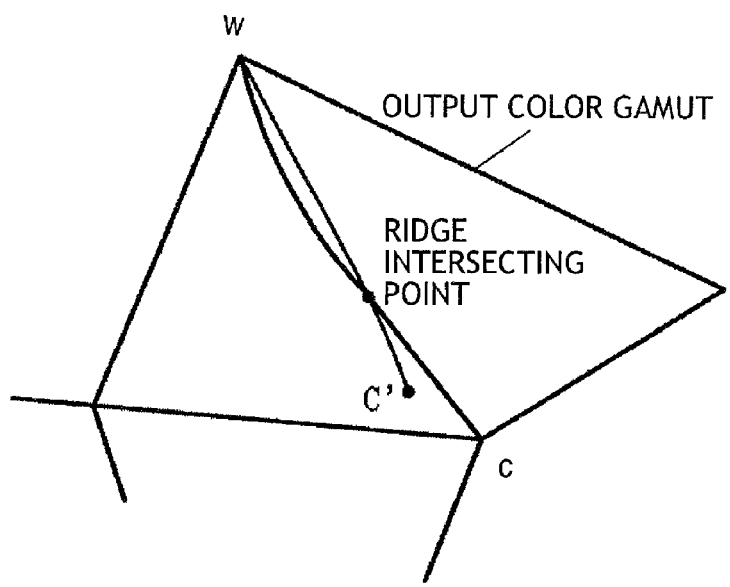

FIG. 9A
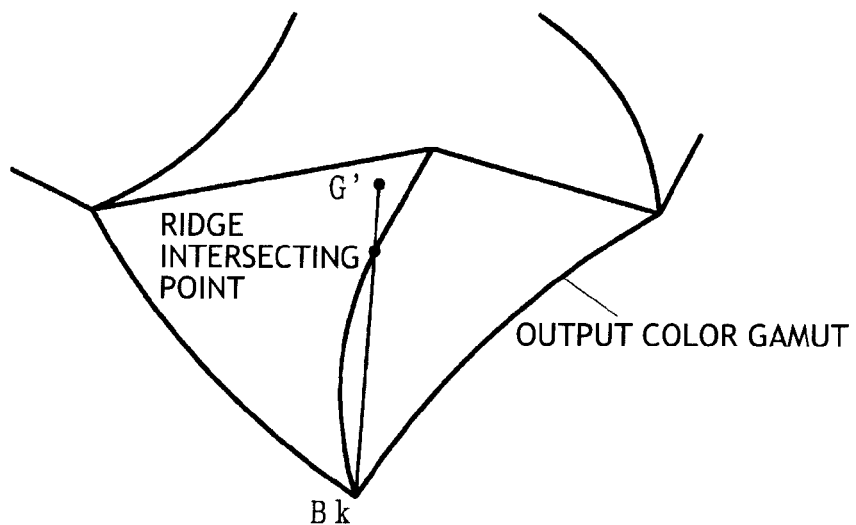
FIG. 9B
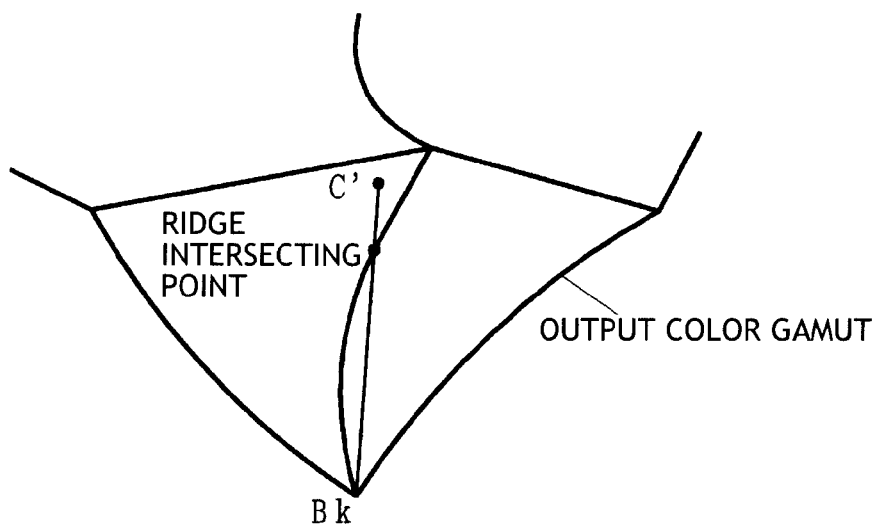

FIG. 10
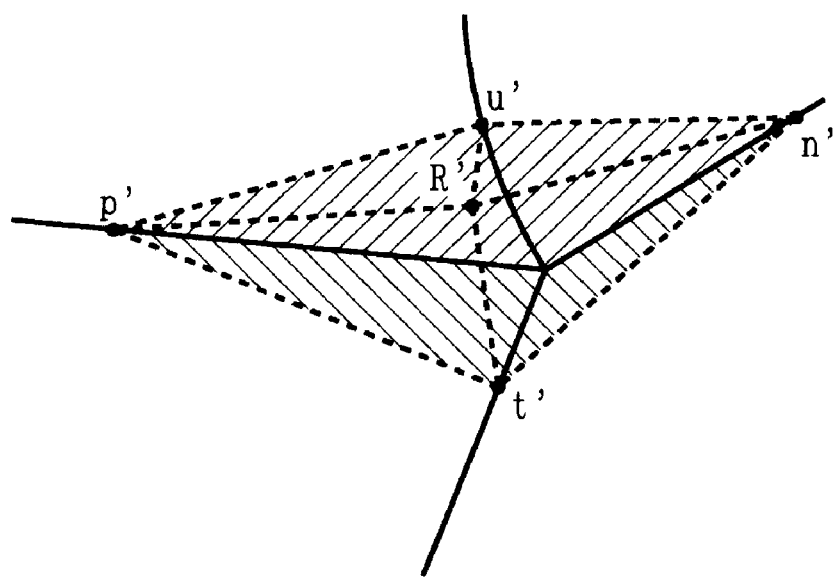

FIG. 11A
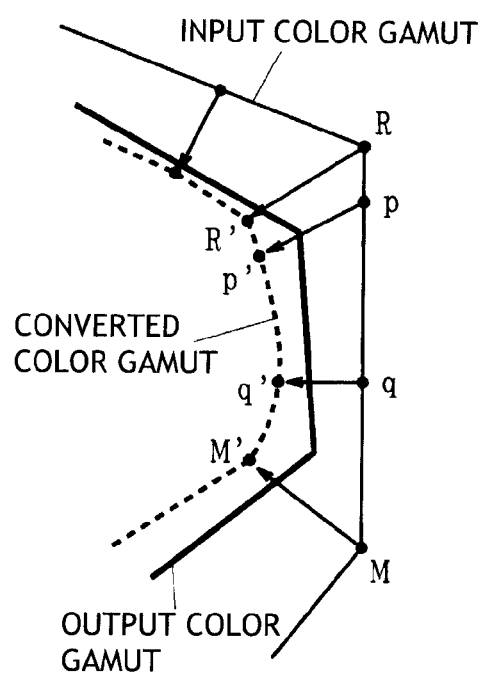
FIG. 11B
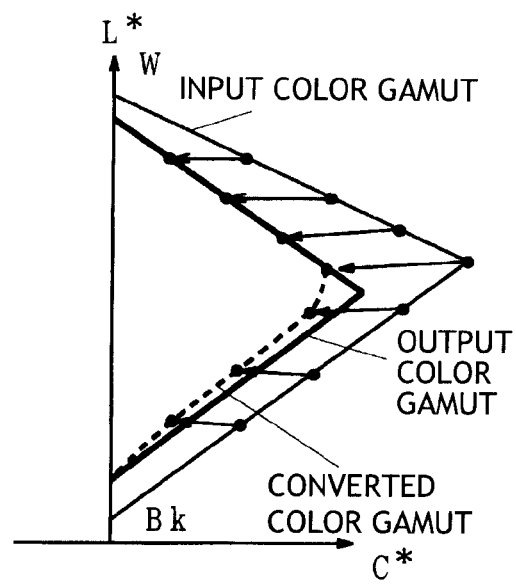

FIG. 12
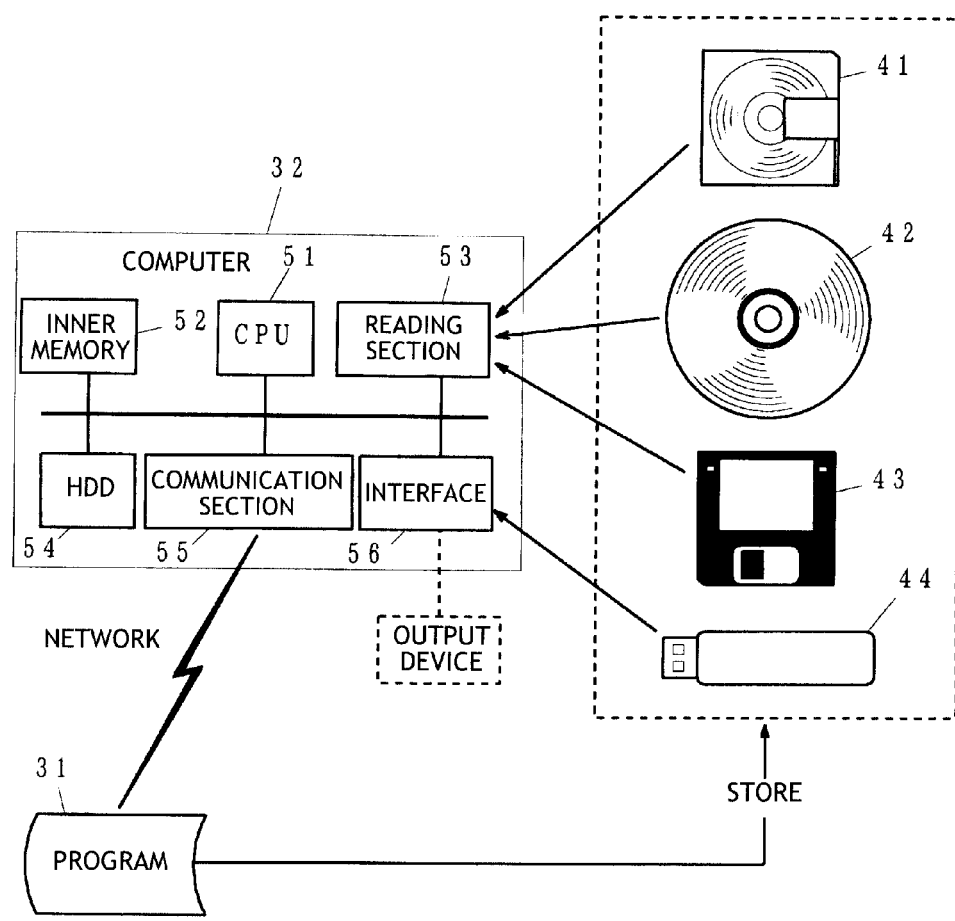

FIG. 13A
RELATED ART
FIG. 13B
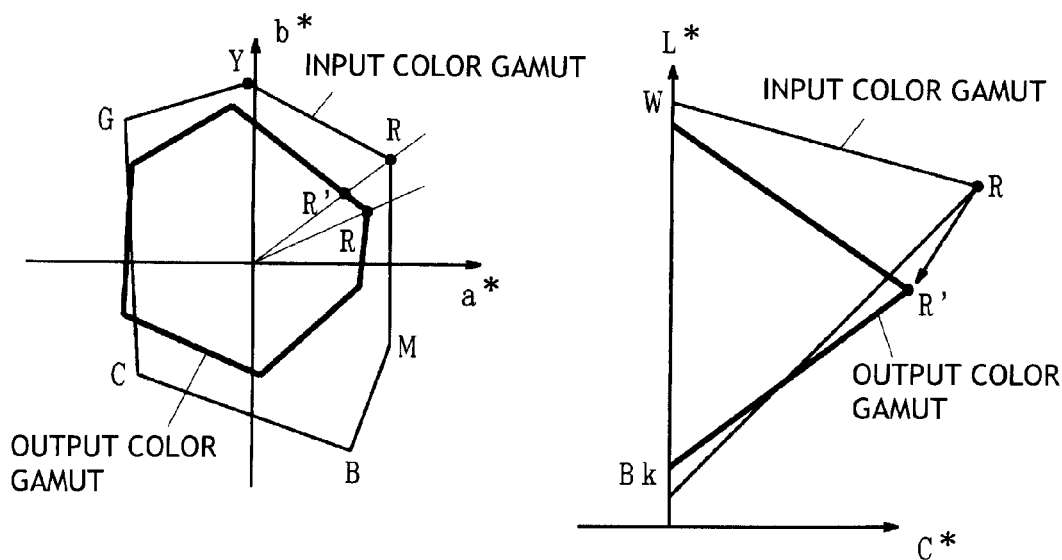

FIG. 14  RELATED ART
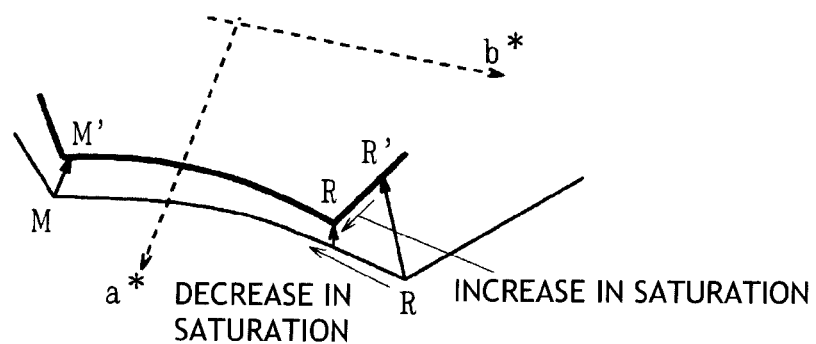

RELATED ART
FIG. 15A  FIG. 15B
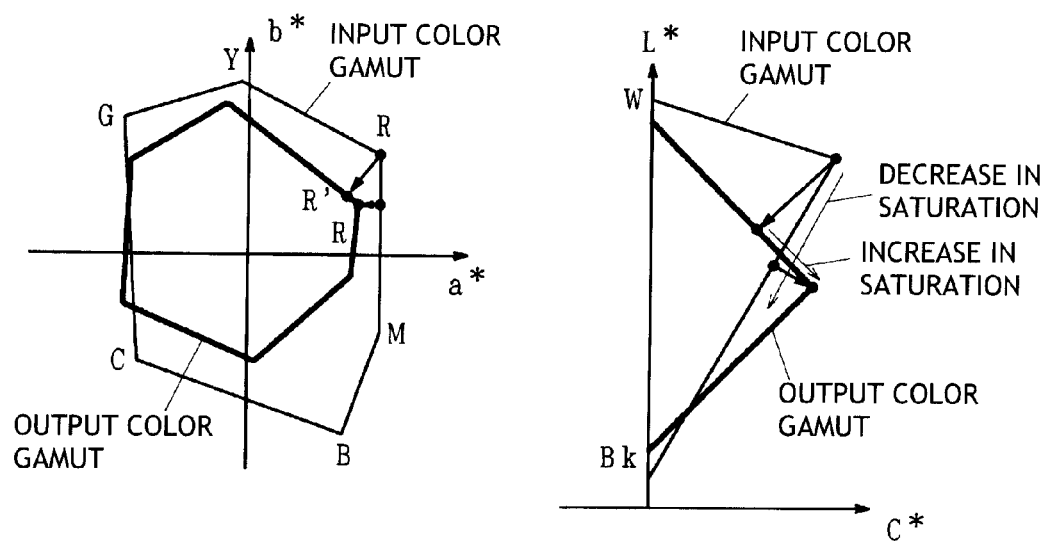

FIG. 16A
RELATED ART
FIG. 16B
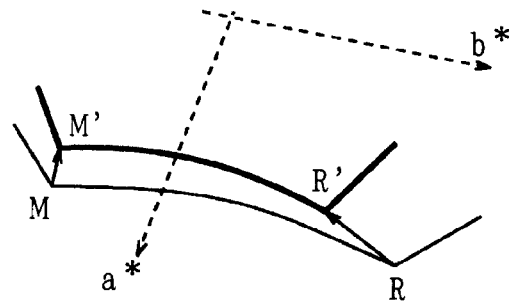
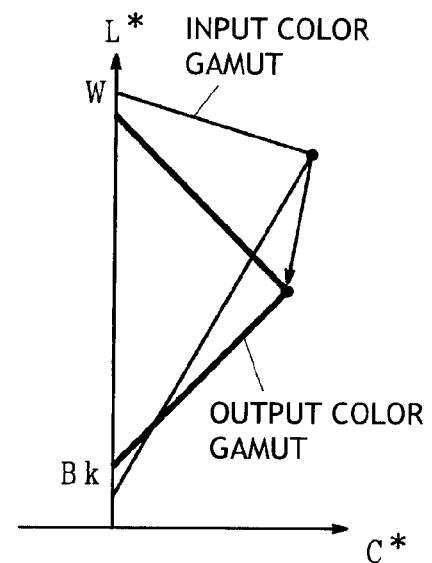

COLOR GAMUT FORMING APPARATUS, COLOR CONVERTING APPARATUS, COLOR GAMUT FORMING METHOD, COLOR CONVERSION METHOD, COMPUTER READABLE MEDIUM AND COMPUTER DATA SIGNAL

CROSS-REFERENCE TO RELATED APPLICATIONS

This application is based on and claims priority under 35 USC 119 from Japanese Patent Application No. 2007-295764 filed Nov. 14, 2007.

BACKGROUND

1. Technical Field

The invention relates to a color gamut forming apparatus, a color converting apparatus, a color gamut forming method, a color conversion method, a computer-readable medium storing a color gamut forming program, a computer-readable medium storing a color converting program and a computer data signal.

2. Related Art

In general, an image input device and an image output device are different in an input color gamut, which is an input or reproducible range of colors. Accordingly, when an image input by the image input device is output by the image output device, a color, being not included in an output color gamut which is a color gamut of the image output device, of colors in the input color gamut which is a color gamut of the image input device cannot be reproduced by the image output device. Therefore, it is necessary to convert a color, being not included in the output color gamut, of the colors in the input color gamut into a color in the output color gamut. Also, it is desired that color reproduction that is close to the image of the input color gamut be performed by the image output device.

There have been suggested several methods of converting colors from the input color gamut to the output color gamut. FIG. 13 is an explanatory diagram illustrating a first example of a color conversion method of a related art. In this method, the hue is not changed, but the lightness and the saturation are changed. This method is employed, for example, in JP 2002-335416 A.

In FIG. 13, a solid line indicates the contour of the input color gamut and a bold line indicates the contour of the output color gamut. FIG. 13 shows an example in which red (R) is converted. In the first example, as shown in FIG. 13B, the red (R) in the input color gamut is changed in the saturation direction and in the lightness direction, and is converted into a color indicated by R' on the contour of the output color gamut. The color R' is different from the red (R) in the input color gamut as shown in FIG. 13(A).

FIG. 14 is an explanatory diagram illustrating a change in color in the first example of the color conversion method of the related art. FIG. 14 shows that when colors are converted using the method shown in the first example of the related art, what colors the colors on the contour of the input color gamut are converted into. First, as shown in FIG. 14, a color is changed in a direction from the red R to magenta M along the contour of the input color gamut. As the color gets apart from the red R, the saturation and the lightness slowly decrease, and then the color is changed to magenta M while the saturation slowly increases from a certain degree. However, in the output color gamut, the saturation increases from the color R' to the red R and then, the saturation decreases. Accordingly, the change in saturation is inverted in the vicinity of the red. Thus, the impression of the color would be different.

FIG. 15 is an explanatory diagram illustrating a second example of the color conversion method of the related art. In this method, a color is converted into a color having a small color difference from the original color. For example, this method is employed in JP 2003-153020 A to generate a common color gamut of plural color gamuts and then to perform color conversion for the common color gamut.

When the method shown in the second example is used, the change in saturation in the input color gamut is different from that in the output color gamut as described with reference to FIG. 14. As can be seen from FIG. 15B, when the saturation decreases along the contour of the input color gamut from a color having the highest saturation, the saturation slowly decreases in the input color gamut. However, in the output color gamut, the saturation once increases and then decreases. Thereby, the impression of colors is greatly changed due to the inversion of the change in color.

FIG. 16 is a diagram illustrating a third example of the color conversion method of the related art. In this method, saturated colors in the input color gamut are converted into saturated colors of the output color gamut. For example, this method is used in JP 2004-32140 A.

Saturated colors in a color gamut are colors in which one or more color components thereof are 100% and the other color components are 0%. For example, when the color components include red (R), green (G), and blue (B), the saturated colors include 100% R, 100% G and 100% B, and also include cyan (C), magenta (M), and yellow (Y) in which two of R, G and B are 100%. The saturated color may include white and black. For example, when the color components include C, M, Y, the saturated colors include C, M, Y, R, G, B and may further include white, and black. When the color components include black (K) in addition to C, M, and Y, the saturation colors may further include CK, MK, YK, RK, GK, and BK. The saturation colors usually have the local maximum saturation value in comparison with the neighboring colors, and may often form convex points in a three-dimensional device-independent color space such as an LAB color space.

In the third example, as shown in FIG. 16, the saturated colors of the input color gamut are converted into the saturated colors of the output color gamut. Accordingly, a difference in saturation change shown in FIGS. 14 and 15 does not occur. However, the saturated colors of the input color gamut may be greatly different from the saturated colors of the output color gamut. In this case, the impression of an image reproduced is changed.

SUMMARY

According to an aspect of the invention, a color gamut forming apparatus includes a reference color acquiring unit and a converted color gamut forming unit. The reference color acquiring unit sets at least a saturated color, which is reproducible on a contour of an input color gamut, as a reference input color and acquires a reference output color which is a color obtained by converting the input reference color into a color being reproducible in an output color gamut. The converted color gamut forming unit forms, in the output color gamut, a converted color gamut in which the reference output color corresponding to the saturated color on the contour of the input color gamut is a convex point.

BRIEF DESCRIPTION OF THE DRAWINGS

Exemplary embodiments of the invention will be described in detail based on the following figures, wherein:

FIG. 1 is a diagram illustrating the configuration of an exemplary embodiment of the invention;

FIG. 2 is a flow chart illustrating an outline of operations of the exemplary embodiment of the invention;

FIGS. 3A and 3B are explanatory diagrams illustrating a first example of the exemplary embodiment of the invention;

FIG. 4 is an explanatory diagram illustrating a method of obtaining sides connecting reference output colors, according to the first example of the exemplary embodiment of the invention;

FIGS. 5A and 5B are explanatory diagrams illustrating another method of obtaining the sides connecting the reference output colors, according to the first example of the exemplary embodiment of the invention;

FIG. 6 is an explanatory diagram (saturation-hue plane) illustrating a second example of the exemplary embodiment of the invention;

FIG. 7 is an explanatory diagram (saturation-lightness plane) illustrating the second example of the exemplary embodiment of the invention;

FIG. 8 is an explanatory diagram illustrating a ridge intersecting point included in the reference output colors;

FIGS. 9A and 9B are explanatory diagrams illustrating other ridge intersecting points included in the reference output colors;

FIG. 10 is an explanatory diagram illustrating an output color gamut which is eliminated in the second example;

FIGS. 11A and 11B explanatory diagrams illustrating another method of obtaining sides connecting the reference output colors, according to the second example of the exemplary embodiment of the invention;

FIG. 12 is an explanatory diagram illustrating an example of a computer program, a storage medium storing the computer program, and a computer when functions of the exemplary embodiment of the invention are implemented by the computer program;

FIGS. 13A and 13B are explanatory diagrams illustrating a first example of a color conversion method of a related art;

FIG. 14 is an explanatory diagram illustrating a change in color in the first example of the color conversion method of the related art;

FIGS. 15A and 15B are explanatory diagrams illustrating a second example of the color conversion method of the related art; and FIGS. 16A and 16B are explanatory diagrams illustrating a third example of the color conversion method of the related art.

DETAILED DESCRIPTION

FIG. 1 is a diagram illustrating the configuration of an exemplary embodiment of the invention. In the figure, reference numeral 1 denotes a color gamut information acquiring section, reference numeral 2 denotes a reference color acquiring section, reference numeral 3 denotes a color gamut forming section, and reference numeral 4 denotes a color conversion section. The color gamut information acquiring section 1 acquires information of an input color gamut and information of an output color gamut. When the input color gamut and the output color gamut are provided, for example, as an ICC profile, the ICC profile may be used as the information of the input color gamut and the information of the output color gamut.

The reference color acquiring section 2 sets several points, which are reproducible on a contour of the input color gamut, as reference input colors, and acquires reference output colors which are colors obtained by converting the input reference colors into colors being reproducible in the output color gamut. The reference input colors includes at least a saturated color on the contour of the input color gamut and may further include plural colors on the contour of the input color gamut. A method of acquiring the reference output colors corresponding to the reference input colors is arbitrary. For example, colors that are reproduced by the image output apparatus as colors being close to the image in the input color gamut may be set to the reference output colors. Also, if a reference output color is located outside the output color gamut, a color on the contour of the output color gamut may be used as the reference output color. For a reference input color having higher lightness than that of a high-saturation color in the input color gamut, a color which is located on the contour of the output color gamut and which has a higher lightness than the lightness of a high-saturation color in the output color gamut may be used as the reference output color.

In addition to the colors corresponding to the reference input colors, if an intersecting point between (i) a locus of colors obtained by converting colors in a range of from the reference input color corresponding to the saturated color on the contour of the input color gamut to a white color into colors being reproducible in the output color gamut and (ii) a locus of colors in a case where color reproduction is performed with primary colors on the contour of the output color gamut exist, a color in the intersecting point may be used as the reference output color. Also, if an intersecting point exists between (i) a locus of colors obtained by converting colors in a range of from the reference input color corresponding to the saturated color on the contour of the input color gamut to a black color into colors being reproducible in the output color gamut and (ii-1) a locus of colors obtained by adding black or adding at an equal ratio two or more color components other than black to a saturated color of a primary color on the contour of the output color gamut, (ii-2) a locus of colors obtained by adding at an equal ratio black and a color component other than black thereto or (iii-3) a locus of colors obtained by adding at an equal ratio one or more color components to a saturated color of a secondary color, a color in the intersecting point may be used as the reference output color. Furthermore, colors in several points at which the contour of the input color gamut intersects the contour of the output color gamut may be used as the reference output colors.

The color gamut forming section 3 forms, in the output color gamut, a converted color gamut in which the reference output color corresponding to a saturated color, which is included in the reference input colors and is located on the contour of the input color gamut, is a convex point. The converted color gamut may be formed by connecting the reference output colors with a straight line or a curve and setting a shape having the straight line or the curve as a side to the converted color gamut. The reference output color may be set as the contour of the output color gamut, and the output color gamut may be formed to have a shape similar to a shape of the input color gamut. In this case, the shape of the input color gamut is preserved in the converted color gamut.

The color conversion section 4 converts an input image forming signal into colors in the converted color gamut using the converted color gamut formed by the color gamut forming section 3. The converting method is arbitrary, and various known methods may be used. The color conversion section 4 may be implemented by an apparatus that is separate from the color gamut information acquiring section 1, the reference color acquiring section 2, and the color gamut forming section 3.

FIG. 2 is a flow chart illustrating an outline of operations of the exemplary embodiment of the invention. In S11, the color gamut information acquiring section 1 acquires information of the input color gamut and information of the output color gamut. In S12, the reference color acquiring section 2 sets several points, which are reproducible on the contour of the input color gamut, as the reference input colors and acquires the reference output colors obtained by converting the reference input colors into colors being reproducible in the output color gamut.

In S13, the color gamut forming section 3 forms the converted color gamut in the output color gamut based on the reference output colors. The converted color gamut is formed so that the reference output colors corresponding to saturated colors, which are a part of the reference input colors in the input color gamut, are convex points of the converted color gamut.

In S14, the input image forming signals are converted into colors in the converted color gamut formed in S13. The converted image forming signal may be subjected to various other processes and be used to form an image. Alternatively, the conversion process may be performed for specific image forming signal, and then various other processes may be performed thereto to form signals for use in the output device. Then, conversion coefficients may be obtained by associating the resultant signals with the original image forming signals. In this case, when an image is formed, a conversion process using the conversion coefficients may be performed.

Hereinafter, outlines of several processes of forming the converted color gamut according to the exemplary embodiment of the invention will be schematically described. In the respective drawings, the contour of the input color gamut is indicated by a solid line, the contour of the output color gamut is indicated by a bold line, and the contour of the converted color gamut is indicated by a broken line. The color space will be shown based on the LAB color space. However, other color spaces may be used.

FIGS. 3A and 3B are explanatory diagrams illustrating a first example of the exemplary embodiment of the invention. In this example, the reference input colors include red (R), green (G), blue (B), cyan (C), magenta (M), and yellow (Y), which are saturated colors on the contour of the input color gamut. Points obtained by converting the reference input colors into colors on the contour of the output color gamut are denoted by R', G', B', C', M', and Y'. The points R', G', B', C', M', and Y' are the reference output colors. As shown in FIG. 3A, the reference output colors may appear in the output color gamut. However, the reference output colors are actually colors, which are located on the contour and have low saturations and different lightnesses as shown in FIG. 3B. In FIG. 3B, the reference input colors may be different in hue from the reference output colors.

The converted color gamut has a shape in which the reference output colors are convex points, and is formed as an area inside the output color gamut. In a simple case, the reference output colors may be connected by straight lines or curves and a shape having the straight lines or curves as sides may be set as the converted color gamut. FIG. 3 shows the case where the reference output colors are connected by straight lines to form the converted color gamut having the straight lines as its sides.

In the converted color gamut, for example, when a color is changed from each convex point to the adjacent convex point, the color is changed from a convex point to another convex point in the converted color gamut. For example, the color change from the saturated color R of the convex point in the input color gamut to M causes a color change from R' to M' in the converted color gamut. Since R' and M' are the convex points, the difference in saturation change before and after the conversion, which is described with reference to the related art, does not occur. As can be seen from FIG. 3B, regarding the color change from a saturated color to a black color, the saturation monotonously decreases in the input color gamut, and the tendency that the saturation monotonously decreases from the convex point of the reference output color is reproduced in the converted color gamut. Thereby, the inversion in saturation and the like, which has been described with reference to the related art, do not occur.

FIG. 4 is an explanatory diagram illustrating another method of acquiring sides connecting the reference output colors, according to the first example of the exemplary embodiment of the invention. Although it has been shown in FIG. 3 that the reference output points are connected by the straight lines to acquire the sides of the converted color gamut, the sides of the converted color gamut may be acquired using other methods. In the example shown in FIG. 4, the sides are calculated using a color difference vector between a reference output color and the corresponding saturated color. In the figure, R' is the reference output color and r is the saturated color. The saturated color r of red is a color, which is reproduced using a red coloring material at a maximum, for example, when the output device uses the red coloring material. For example, when the output device uses yellow and magenta coloring materials, the saturated color is a color which is reproduced using both the yellow and magenta coloring materials at the maximum.

By gradually reducing the color difference vector directing from the saturated color r to the reference output color R' as approaching the adjacent reference output color M', a side between the reference output colors R'-M' may be acquired. The color difference can be obtained using a CIE1976 color-difference formula, a CIE94 color-difference formula, a CIEDE2000 color-difference formula, or the like. The method of reducing the color difference vector is arbitrary.

For the sake of simplicity, FIG. 4 shows that the color difference vector is not generated in the adjacent reference output color M'. However, the color difference vector may be generated in the adjacent reference output color M'. In this case, the shape of a side may be obtained by weighting and synthesizing the color difference vectors of the reference output colors.

In another method, based on amounts of coloring materials used to reproduce the reference output colors by the output device, the amounts of coloring materials are interpolated between the reference output colors, and the sides of the converted color gamut are formed using colors reproduced with the resultant amounts of coloring materials.

FIGS. 5A and 5B are explanatory diagrams illustrating another method of obtaining the sides connecting the reference output colors, according to the first example of the exemplary embodiment of the invention. In this example, the converted color gamut being similar to the input color gamut is formed. Basically, as shown in FIG. 5B, the converted color gamut may be formed so that the reference output colors are the convex points and the converted color gamut has a shape that is similar to the contour of the input color gamut. If the converted color gamut protrudes from the contour of the output color gamut, the protruding portion is restricted to the contour of the output color gamut.

Since each side of the converted color gamut is set so as to pass two reference output colors, the shape of the converted color gamut may not be similar to the contour of the input color gamut in the hue direction. In this example, each side of the converted color gamut between two reference output colors is obtained by gradually changing a saturation ratio of a color on the contour of the converted color gamut to a color on the contour of the input color gamut from a saturation ratio of one of the two reference output colors to the corresponding reference input color to a saturation ratio of the other reference output colors to the reference input color corresponding to the other reference output color.

The sides between the reference output colors may be obtained by a method other than the above-mentioned several methods. If another method is employed, the reference output colors corresponding to the saturated colors of the input color gamut should be the convex points. Also, it is necessary to obtain the sides within the output color gamut.

FIGS. 6 and 7 are explanatory diagrams illustrating a second example of the exemplary embodiment of the invention. If the reference output colors only include the convex points as shown in FIG. 3, there may be the case where the output color gamut is represented only by a simple shape, the case where intermediate colors are not converted into appropriate colors or the case where the output color gamut cannot be utilized effectively. For the purpose of reducing such cases, in this example, points on the contour of the input color gamut other than the saturated colors of the input color gamut are added as the reference input colors, and the converted color gamut is formed using the reference output colors obtained by converting the added reference input colors into colors on the contour of the output color gamut.

For example, one or more reference input colors are set between the saturated colors of the input color gamut. In the example shown in FIG. 6, points p and q are provided between convex points R and M. The reference input colors p and q are converted into reference output colors p' and q'. For example, by connecting these reference output colors R', p', q', and M' in this order by a straight line or a curve, the converted color gamut having a shape having the straight lines or curves as the sides thereof can be formed.

In the lightness direction, for example, as shown in FIG. 7, in addition to the saturated colors, a point on the contour of the input color gamut between a saturated color and a white color or a black color may be added to the reference input colors, and the reference output colors obtained by converting the added reference input color into a color on the contour of the output color gamut may be used to form the converted color gamut. In the example shown in FIG. 7, a point s between the saturated color R of the input color gamut and white (W) and a point t between the saturated color R and black (Bk) are set as the reference input colors. Then, the reference output colors obtained by converting the reference input colors s and t into colors on the contour of the output color gamut are obtained as s' and t'. The converted color gamut is formed using the reference output colors s' and t' as well as the other reference output colors. In the example shown in FIG. 7, by connecting the white color of the output color gamut, s', R', t', and the black color of the output color gamut in this order by straight lines or curves, the converted color gamut having a shape having the straight lines or curves as the sides can be formed. In the example shown in FIG. 7, the resultant converted color gamut is wider on low-lightness side than that of the example shown in FIG. 3, and it can be seen that the output color gamut is utilized.

FIG. 8 is an explanatory diagram illustrating an example of a ridge intersecting point to be included in the reference output colors. Colors that are reproduced using one of coloring materials used in the output device are referred to as primary colors, and colors that are reproduced using two of the coloring materials are referred to as secondary colors. The primary color and the secondary color obtained using two coloring materials in equal ratio are originally constant-hue colors, but are actually located on a smooth curve, for example, in the LAB color space, are higher in lightness than the other secondary colors, and are formed in a ridge shape on the contour of a color gamut. In FIG. 8, the curve extending from color c to white w corresponds to this ridge.

On the other hand, as described above, the reference output colors set as the convex points may not correspond to the saturated colors on the contour of the output color gamut. For example, in FIG. 8, the reference output color C' is not identical with the saturated color c on the contour of the output color gamut. In this case, consider a constant-hue plane that is equivalent in hue to the reference output color C'. This plane may intersect the curve of the ridge shape. This intersecting point is referred to as a "ridge intersecting point". When the ridge intersecting point exists, the curve portion extending from the ridge intersecting point to white w can be used as a side of the converted color gamut by adding the ridge intersecting point to the reference output colors, and the converted color gamut is widened in the lightness direction. Accordingly, in comparison with the case where the ridge intersecting point is not used as the reference output color, the converted color gamut effectively utilizing the output color gamut is formed.

FIG. 8 shows a portion having lightness higher than those of the saturated colors on the contour of the output color gamut. However, if the ridge intersecting point is obtained in an area lower in lightness than those of the saturated colors on the contour of the output color gamut, the ridge intersecting point may be added to the reference output colors. FIG. 9 is an explanatory diagram illustrating another ridge intersecting point to be included in the reference output colors. FIG. 9A shows the case where a locus of colors in a range of from the reference output color (G') corresponding to a saturated color of a secondary color in the input color gamut to black (Bk) intersects a locus of colors obtained by adding another color component to a saturated color of a secondary color in the output color gamut. In this case, the intersecting point may be added to the reference output colors. Also, FIG. 9B shows the case where a locus of colors in a range of from the reference output color (C') corresponding to a saturated color of a primary color in the input color gamut to black (Bk) intersects a locus of colors obtained by adding another color component to a saturated color of a primary color on the contour of the output color gamut at an equal ratio. In this case, the intersecting point may be added to the reference output colors. In the example shown in FIG. 9B, when black is used as a color component, the ridge may be a locus obtained by adding black to a saturated color of a primary color, a locus obtained by adding two or more color components other than black to the saturated color of the primary color at an equal ratio, or a locus of colors obtained by adding black and a color component other than black at an equal ratio.

For example, when straight lines or curves intersect the contour of the output color gamut at the time of connecting the reference output colors by the straight line or curves, the intersecting point may be added to the reference output colors and a converted color gamut is formed to have the contour of the output color gamut as the side extending from the intersecting point. For example, colors often used in graphics may be added to the reference input colors, and colors obtained by converting such reference input colors into colors on the contour of the output color gamut may be added to the reference output colors. In this case, the often used colors can be easily converted into desirable colors, thereby improving the assessment of the color conversion result. A user's setting reference input colors or reference output colors may be received and the reference output colors corresponding to the set reference input colors or the set reference output colors may be added, thereby forming a converted color gamut.

FIG. 10 is an explanatory diagram illustrating an output color gamut which is eliminated in the second example. When points other than the convex points are added as the reference output colors, an area including a saturated color in the output color gamut is not often included in the converted color gamut. In FIG. 10, the reference output color R', which is the convex point, and the reference output colors n', p', and t' other than the convex point are located on the sides of the output color gamut, and the ridge intersecting point u' is obtained. In this case, the hatched area on the contour of the output color gamut is eliminated from the converted color gamut. Accordingly, sides R'n', R'p', R't', R'u', p't', t'n', n'u', and u'p' constitute the contour of the output color gamut. By not using a part of the output color gamut, the problem with the inversion of color changes is prevented from occurring. FIG. 10 shows just a part, and a part of the other portions of the output color gamut is also eliminated to form the converted color gamut.

FIG. 11 is an explanatory diagram illustrating another method of obtaining the sides connecting the reference output colors, according to the second example of the exemplary embodiment of the invention. As described above, when colors other than the colors of the convex points are added as the reference output colors, for example, curves such as spline may be used to connect the reference output colors in addition to the straight lines, as a method of obtaining the sides of the converted color gamut by connecting the reference output colors. FIG. 11 shows this case.

When the curves such as spline are used, the curves are formed to include the reference output colors of the convex points, and the reference output colors may be connected by the curves using the reference output colors of the convex points. The sides of the converted color gamut passing through the reference output colors may be obtained using various functions in place of the spline. Of course, when plural reference output colors exist, a curve obtained by averaging the reference output colors.

FIG. 12 is an explanatory diagram illustrating a computer program, a storage medium storing the computer program, and a computer when the functions of the exemplary embodiment of the invention are implemented by the computer program. In the figure, reference numeral 31 denotes a program, reference numeral 32 denotes a computer, reference numeral 41 denotes a magneto-optical disk, reference numeral 42 denotes an optical disk, reference numeral 43 denotes a magnetic disk, reference numeral 44 denotes a memory, reference numeral 51 denotes a CPU, reference numeral 52 denotes an inner memory, reference numeral 53 denotes a reading section, reference numeral 54 denotes a hard disk, reference numeral 55 denotes an interface, and reference numeral 56 denotes a communication section.

All or a part of the functions of the elements described in the exemplary embodiment can be embodied by the program 31 executable by the computer. In this case, the program 31, data used in the program, and data of conversion coefficients may be stored in a computer-readable storage medium. The storage medium is a medium that can transmit details of the program and data to the reading section 53 provided as hardware resources of the computer in the format of corresponding signals by causing a variation in magnetic, optical, and electrical energy depending on the details described in the program with respect to the reading section 53. For example, an example of the storage medium includes the magneto-optical disk 41, the optical disk 42 (including a CD and a DVD), the magnetic disk 43, and the memory 44 (including an IC card and a memory card). The storage medium is not limited to the portable mediums.

By storing the program 31 in the storage medium and for example, mounting the storage medium onto the reading section 53 or the interface 55 of the computer 32, the program 31 is read by the computer and is stored in the inner memory 52 or the hard disk 54, and the program 31 is executed by the CPU 51, thereby performing all or a part of the functions of the above-mentioned embodiment. Alternatively, the program 31 may be transmitted to the computer 32 through a network, the program 31 may be received by the communication section 56 of the computer 32 and stored in the inner memory 52 or the hard disk 54, and the program 31 may be executed by the CPU 51, thereby performing all or a part of the functions of the above-mentioned embodiment.

An output device forming an image may be connected through the corresponding interface 55 and the image may be formed in accordance with color signals converted by the function of the color conversion section 4. Various devices may be connected to the computer 32 through the interface 55.

Of course, a part of the functions may be embodied by hardware or all thereof may be embodied by hardware. As described above, the process of forming the converted color gamut to form the conversion coefficients used in the color conversion section 4 by the use of the color gamut forming section 3 and the process of performing a color converting operation using the conversion coefficients by the use of the color conversion section 4 may be separated and performed by separated programs.

What is claimed is:

1. A color gamut forming apparatus comprising:
a central processing unit;
a reference color acquiring unit that sets at least a saturated color, which is reproducible on a contour of an input color gamut, as a reference input color and acquires a first reference output color which is a color obtained by converting the input reference color into a color being reproducible in an output color gamut; and
a converted color gamut forming unit that forms, in the output color gamut, a converted color gamut in which the first reference output color corresponding to the saturated color on the contour of the input color gamut as a convex point,
wherein if an intersecting point between (i) a first locus of colors obtained by converting only colors in a range from the saturated color on the contour of the input color gamut and increasing in lightness to a white color, into colors being reproducible in the output color gamut on a constant hue plane that passes the first reference output color and (ii) a second locus of colors, not a subset of the first locus of colors, obtained by performing color reproduction with primary colors on the contour of the output color gamut exists, then the reference color acquiring unit acquires a color in the intersecting point as a second reference output color,
wherein the intersecting point is converted from a color other than any saturated color, and
wherein the saturated color is a color other than black, and
wherein at least one more color from the second locus of colors, but not from the first locus of colors, is acquired as a third reference output color, and the third reference output color has higher lightness than the second reference color.

2. The color gamut forming apparatus according to claim 1, wherein the reference color acquiring unit sets a plurality of colors, which are reproducible on the contour of the input color gamut, as reference input colors.

3. The color gamut forming apparatus according to claim 2, wherein the reference color acquiring unit acquires a color, which is located on the contour of the output color gamut and which has higher lightness than that of a high-saturation color in the output color gamut, as the third reference output color, for a reference input color having higher lightness than that of a high-saturation color in the input color gamut.

4. The color gamut forming apparatus according to claim 1, wherein the converted color gamut forming unit forms the converted color gamut having a shape including, as a side, a straight line or a curve connecting reference output colors.

5. The color gamut forming apparatus according to claim 1, wherein the converted color gamut forming unit sets reference output colors as the contour of the output color gamut and forms the output color gamut having a shape similar to a shape of the input color gamut.

6. A color converting apparatus comprising:
   a color conversion unit that converts an input image forming signal into colors in the converted color gamut, using the converted color gamut formed by the color gamut forming apparatus according to claim 1.

7. A non-transitory computer-readable medium storing a program that causes a computer to execute a process for forming a color gamut, the process comprising:
   setting at least a saturated color, which is reproducible on a contour of an input color gamut, as a first reference input color;
   acquiring a reference output color which is a color obtained by converting the input reference color into a color being reproducible in an output color gamut; and
   forming a converted color gamut in the output color gamut in which the first reference output color corresponding to the saturated color on the contour of the input color gamut as a convex point,
   wherein if an intersecting point between (i) a first locus of colors obtained by converting only colors in a range from the saturated color on the contour of the input color gamut and increasing in lightness to a white color, into colors being reproducible in the output color gamut on a constant hue plane that passes the first reference output color and (ii) a second locus of colors, not a subset of the first locus of colors, obtained by performing color reproduction with primary colors on the contour of the output color gamut exists, then the reference color acquiring comprises acquiring a color in the intersecting point as a second reference output color,
   wherein the intersecting point is converted from a color other than any saturated color, and
   wherein the saturated color is a color other than black, and
   wherein at least one more color from the second locus of colors, but not from the first locus of colors, is acquired as a third reference output color, and the third reference output color has higher lightness than the second reference color.

8. A non-transitory computer-readable medium storing a program that causes a computer to execute a color conversion process, the process comprising:
   converting an input image forming signal into colors in the converted color gamut, using the converted color gamut formed by the color gamut forming apparatus according to claim 1.

9. A color gamut forming method comprising:
   setting at least a saturated color, which is reproducible on a contour of an input color gamut, as a first reference input color;
   acquiring a reference output color which is a color obtained by converting the input reference color into a color being reproducible in an output color gamut; and
   forming a converted color gamut in the output color gamut in which the first reference output color corresponding to the saturated color on the contour of the input color gamut as a convex point,
   wherein if an intersecting point between (i) a first locus of colors obtained by converting only colors in a range from the saturated color on the contour of the input color gamut and increasing in lightness to a white color, into colors being reproducible in the output color gamut on a constant hue plane that passes the first reference output color and (ii) a second locus of colors, not a subset of the first locus of colors, obtained by performing color reproduction with primary colors on the contour of the output color gamut exists, then the reference color acquiring comprises acquiring a color in the intersecting point as the reference output color,
   wherein the intersecting point is converted from a color other than any saturated color, and
   wherein the saturated color is a color other than black, and
   wherein at least one more color from the second locus of colors, but not from the first locus of colors, is acquired as a third reference output color, and the third reference output color has higher lightness than the second reference color.

* * * * *